United States Patent [19]

Zemek et al.

[11] Patent Number: 4,607,421

[45] Date of Patent: Aug. 26, 1986

[54] METHOD AND APPARATUS FOR DETERMINING SPRING PRELOADING IN A FLUID HANDLING DEVICE

[75] Inventors: Thomas G. Zemek, Mansfield; Antonio B. Caruolo, Vernon, both of Conn.; Stephanie A. Roberts; James K. Dunn, both of Columbia, S.C.; John Spearen, Irmo, S.C.

[73] Assignee: United Technologies Corporation, Hartford, Conn.

[21] Appl. No.: 751,712

[22] Filed: Jul. 2, 1985

[51] Int. Cl.[4] ...................... B21D 53/00; B23Q 15/00; B23P 21/00; G01L 25/00

[52] U.S. Cl. ............................ 29/157.1 R; 29/157 C; 29/407; 29/705; 29/714; 29/720; 73/432 R

[58] Field of Search .......... 29/157 R, 157 C, 157.1 R, 29/407, 705, 709, 714, 720; 239/600; 251/129; 60/740; 73/432 R, 1 B

[56] References Cited

U.S. PATENT DOCUMENTS

| | | | |
|---|---|---|---|
| 2,970,467 | 2/1961 | Pettibone | 29/157.1 R X |
| 3,107,417 | 10/1963 | Jaquish et al. | 29/407 X |
| 3,123,903 | 3/1964 | Flanagan | 29/407 |
| 3,949,456 | 4/1976 | Oberthur | 29/157.1 R |
| 4,481,699 | 11/1984 | Knapp et al. | 29/157.1 R |
| 4,558,498 | 12/1985 | Satoh | 29/157.1 R |

*Primary Examiner*—Howard N. Goldberg
*Assistant Examiner*—R. S. Wallace
*Attorney, Agent, or Firm*—John Swiatocha

[57] ABSTRACT

Required preloading of a valve closing spring (80) in a pressure operated, fluid handling device (10) is determined by mechanically precompressing the spring, applying operating pressure to the device and relieving the bias on the spring until the operating pressure opens the valve, the thickness of a shim (75) for effecting such preloading being equal to the difference between the change in spring length due to the precompression thereof and the change in spring length due to relief of the precompression prior to spring opening.

9 Claims, 2 Drawing Figures

METHOD AND APPARATUS FOR DETERMINING SPRING PRELOADING IN A FLUID HANDLING DEVICE

TECHNICAL FIELD

This invention relates to a method and apparatus for determining spring preloading in the assembly of a fluid handling device.

BACKGROUND ART

Many known fluid handling devices employ a movable fluid flow controlling member biased by a spring. Valves in particular frequently employ such construction, the movable member comprising a valve element biased toward engagement with a mating seat by the spring. In valves employed in fuel injectors in automotive fuel injection systems, the valve element and spring are typically arranged within a housing such that the valve element remains seated and the valve closed under the bias of the spring until the force from fluid at predetermined, critical pressure within the injector overcomes the spring bias and the valve opens. In automotive fluid injectors, uniformity in the critical opening pressure of all the injectors within a single system is imperative. To achieve such uniformity within the limits of normal dimensional and metallurgical variations in the component parts which make up an injector, it is a common practice to adjust the injector as it is assembled to open at the desired critical pressure. A common method of making such an adjustment involves the preloading (adjusting the length) of the spring which maintains the seating of the injector valve by means of shimming the spring, thereby increasing the seating force applied to the valve element by the spring. Heretofore, such adjustment required testing each fuel injector to determine its characteristic opening pressure and then disassembling of the injector, shimming the spring, reassembling the injector and retesting thereof, the size of the shims being determined primarily by guesswork on the part of the assembler. As those skilled in the art of valve assembly will appreciate, to achieve a precise opening pressure, it may be necessary to repeat the shimming procedure set forth hereinabove, a number of times until the required shim thickness are determined. It will also be appreciated that such trial and error techniques are time consuming, costly and do not lend themselves to the automated assembly of such components.

DISCLOSURE OF INVENTION

It is therefore, an object of the present invention to provide an improved method and apparatus for adjusting the preloading of springs employed in such fluid handling apparatus as automotive fuel injectors.

It is another object of the present invention to provide such a method and apparatus which is particularly suited for automated, mass assembly techniques.

It is yet another object of the present invention to provide such a method and apparatus wherein shim thicknesses required for spring reloading are deduced rather than determined by trial and error techniques.

These and other objects which will become more readily apparent from the following detailed description taken in connection with the appended claims and accompanying drawing, are achieved by a method and apparatus wherein, as they are assembled, the component parts of a fluid handling device such as a fuel injector, are subjected to fluid flow conditions simulating those of actual operation, changes in length of the valve biasing spring under such simulated conditions being measured and from such length changes, the thickness of a shim (spacer) required to achieve a predetermined critical opening pressure being determined. Once the required shim thickness is known, the spring is assembled in the device with a shim of that thickness to achieve required preloading without repeated assembly and disassembly of the device required with prior art trial and error methods. The apparatus employed in the preferred embodiment for determining proper spring preloading is particularly useful with automated fuel injector assembly machines and techniques. The apparatus includes a first fixture in which a nozzle and needle valve of a fuel injector are mounted, a second fixture in which the spring and guide therefore are received; a plunger connecting the spring to the needle valve; a press for precompressing the spring and a means for measuring the changes in length of the spring as it is precompressed and subsequently released. In determining the spring preloading required in the fluid handling device being assembled, the spring and needle valve are assembled with the plunger in the fixtures such that the needle valve is closed against a seat therefor. Fluid at the desired critical valve opening pressure is applied to the needle valve and the spring is precompressed (biased) by the press in a valve closing direction with a force having a magnitude in excess of that corresponding to the critical opening pressure. The spring bias is gradually relieved as the change in length of the spring from such bias relief is measured. This bias relief is continued until the fluid pressure on the needle valve causes the valve to open. At the point of valve opening, the thickness of the shim required to achieve such opening at the desired critical pressure opening is calculated from the changes in length of the spring due to the initial bias thereon and the relief of that bias prior to valve opening.

BEST MODE OF CARRYING OUT THE INVENTION AND INDUSTRIAL APPLICABILITY THEREOF

Figure 1:
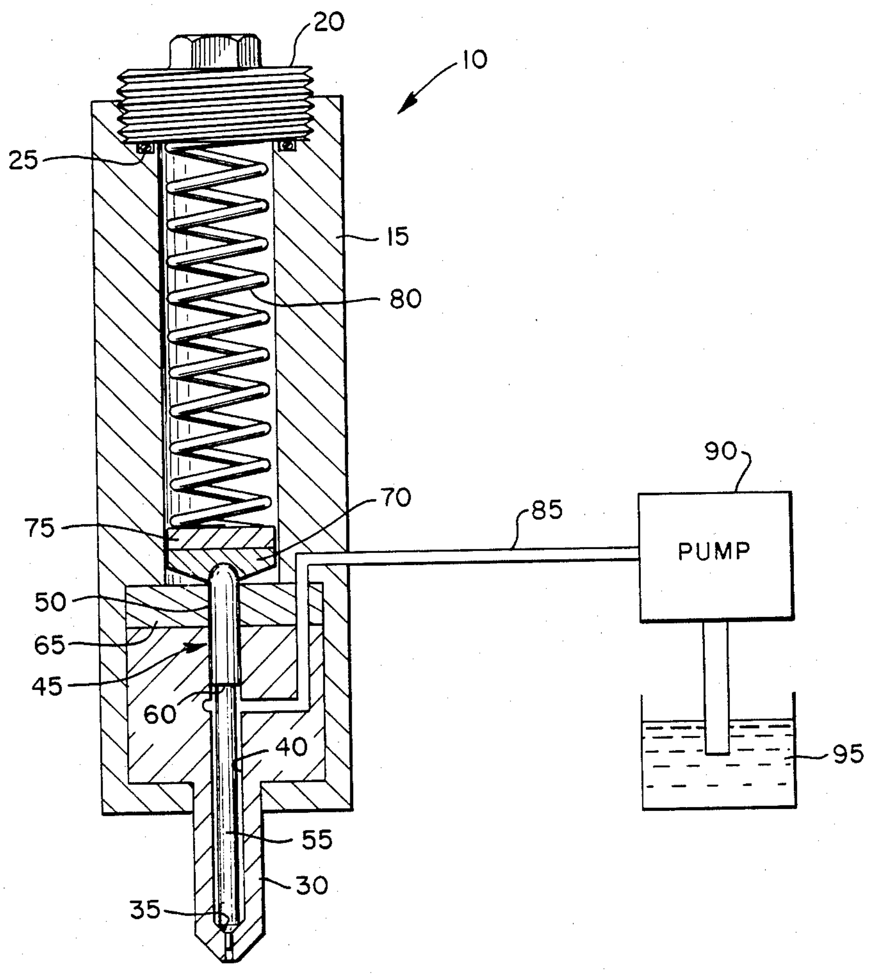
FIG. 1 is a schematic of a fluid handling device such as an automotive fuel injector having a spring which is preloaded in accordance with the present invention.

Referring to the drawings, an automotive fuel injector is shown at 10, the injector comprising a housing 15, closed at the upper end thereof by a plug 20 and O-ring seal 25. The housing carriers, at the opposite end thereof, a nozzle 30 having a valve seat 35 at the end thereof and an internal fluid passage 40 therein. Passage 40 accommodates a needle valve element 45 therein having an upper end portion 50 and a lower portion 55 of reduced diameter which, with upper portion 50 defines an annular shoulder 60. Upper portion 50 of the needle valve element slidably extends through an aperture disposed centrally in spacer seal 65, the tip of enlarged end 50 being received within a depression centrally disposed in spring guide 70 which is slidably disposed within housing 15. Guide 70 supports a shim 75 which, when the fuel injector is fully assembled, provides a compressive preload on spring 80 received within the housing between plug 20 and shim 75. Passage 40 connects to a conduit 85 which communicates at the opposite end thereof with an outlet of a fuel pump 90 which draws fuel from reservoir 95 thereof. In operation, the output of pump 90 is channeled through duct 85 to the passage in nozzle 30. Needle valve 45 remains seated against seat 35 under the bias of spring 80 until fuel pressure within passage 40 increases to a critical opening magnitude at which point fuel pressure acting against shoulder 60 lifts the needle valve element against the spring bias to open the valve and cause fuel to be pumped out of the injector nozzle 30, past seat 35.

As set forth hereinabove, in the assembly of fuel injectors such as that shown at 10, the pressure at which the needle valve thereof opens must be set with great precision. Those skilled in the art will readily recognize that the opening pressure of the injector is determined by the physical characteristics of the injector components such as the spring rate of spring 80 and the dimensions of the housing, nozzle, spacer seal, guide, shim and needle valve. It will also be recognized that even with normal variations in the material and dimensions of the fuel injector components, the critical opening pressure of the injector can be precisely controlled by controlling the thickness of shim 75 to in turn control the closing force applied to the needle valve by spring 80. In accordance with the present invention, in the automated assembly of fluid handling devices such as fuel injectors, the thickness of shim 75 can be precisely determined for each injector without the laborous and time consuming trial and error techniques associated with prior art assembly methods described hereinabove.

Figure 2:
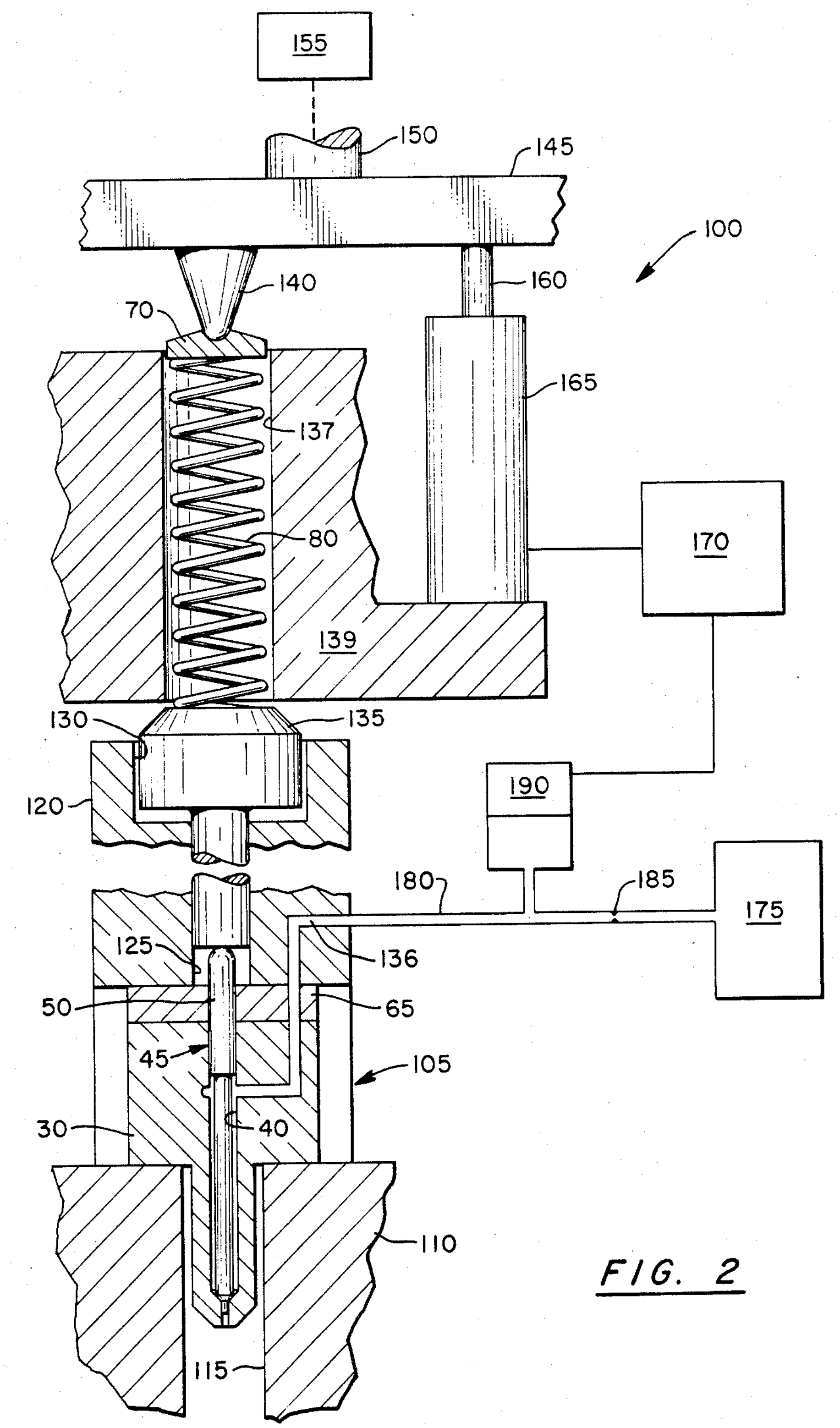
FIG. 2 is a schematic representation of an apparatus employed in the present invention to determine such spring preloading required to achieve opening of the injector of FIG. 1 at a predetermined critical opening pressure.

Referring to FIG. 2, an apparatus 100 is shown which, with the method of the present invention, is used to precisely determine the shim thickness required to adjust the injector exactly to a desired critical opening pressure prior to final assembly of the injector. Apparatus 100 comprises a first fixture 105 within which nozzle 30 and spacer seal 65 are received. Fixture 105 includes a lower portion 110 bored at 115 to receive nozzle 30 and needle valve 45 therein and a medial portion 120 bored at 125 and counterbored at 130 to receive a force transmitting plunger 135 therethrough. Medial portion 120 also includes a passage 136 therein which communicates with the fuel passages in the fuel injector nozzle and spacer seal. Plunger 135 provides a rigid mechanical connection between injector spring 80 received within bore 137 of upper fixture portion 139, and the tip of enlarged end 50 of needle valve 45. Spring guide 70 is supported in an inverted orientation thereof by the upper end of spring 80. The central depression of guide 70 which, in the assembled injector receives the large tip of needle valve 50, receives a conical pin 140 extending downwardly from horizontal member 145 firmly fixed to the lower end of output shaft 150 of press 155. Horizontal member 145 also connects output shaft 150 with input rod 160 of a measuring device 165 such as a linear variable differential transformer (LVDT) which, as illustrated, may be vertically supported on upper fixture member 139. The output of LVDT 165 is fed to a controller 170 which, as set forth hereinafter, performs a simple algebraic algorithm to determine the shim thickness necessary to achieve a desired critical opening pressure with the fuel injector components assembled in apparatus 100. A source of fluid 175 at the desired critical opening pressure communicates with passage 136 in fixture 120 through conduit 180 thereby communicating with passage 40 in nozzle 30. Conduit 180 is provided with internal orifice 185 and pressure transducer 190 the output of which, along with the output of the LVDT, is fed as an input signal to controller 170.

To determine the shim thickness required to achieve a desired critical opening pressure, the spring guide, spring, needle valve and nozzle are assembled in apparatus 100 as shown in FIG. 2. Press 155 is then actuated to bias spring 80 in a valve closing direction with a force of a magnitude in excess of that corresponding to the application of critical opening pressure to the needle valve shoulder. With the spring so biased, critical opening pressure is established by reservoir 175 in passage 40 and on needle valve element 55. LVDT 165 feeds a signal to controller 170, indicative of the amount of compression (change in length) of spring 80 due to the biasing thereof by press 155. Likewise, pressure transducer 190 provides controller 170 with an input corresponding to the pressure in line 180. With the biasing and pressurization conditions so set, and the spring compression and fluid pressure signals so input to controller 170, the bias on spring 80 is gradually relieved to press 155 while LVDT 165 continuously measures the expansion (increase in length) of the spring resulting in the bias relief and feeds this information to controller 170. When the bias on the spring is sufficiently relieved, the closing force which the spring applies to needle valve 45 will equal the opening force applied to the needle valve by the fluid in reservoir 175. Thus, any further relief of the bias on the valve will allow the needle valve to open under the influence of the fluid pressure thereon. Opening of the needle valve causes the pressure in conduit 180 downstream of orifice 185 to suddenly drop. This sudden drop in pressure is detected by transducer 190 and fed to controller 170 which determines the total expansion of spring 80 required to relieve the force on the needle valve sufficiently to allow the valve to open from fluid pressure thereon. Controller 170 then determines the thickness of shim 75 required to achieve opening of the needle valve at the critical opening pressure under actual operating conditions by performing the following algorithm:

$$ST = \Delta L_1 - \Delta L_2$$

wherein:

ST is the required shim thickness;

$\Delta L_1$ is the amount of spring compression due to the initial bias thereon by press 155; and $\Delta L_2$ is the amount of expansion of the spring resulting from bias relief sufficient to allow the opening of the fuel injector valve by the pressurized fluid.

With the required shim thickness so determined, the injector components can then be assembled in a housing with an appropriately sized shim with assurance that the resulting fuel injector will open precisely at the desired critical opening pressure.

It will be apparent that with the method and apparatus of the present invention, springs for fluid handling devices such as automotive fuel injectors may be accurately preloaded without resort to prior art trial and error methods. Therefore, the method and apparatus of the present invention are particularly appropriate for automated assembly techniques wherein robotic machinery performs the method described herein, selects an appropriately sized shim from a bank of shims of varying thickness and assembles the component parts. Although this method and apparatus may be particularly well suited for automated fuel injector assembly techniques, it will be appreciated that the method and apparatus are also ideally suited for manual assembly methods. Furthermore, while particular embodiments of the method and apparatus have been described and illustrated, it is intended by the following claims to cover all equivalent forms of the invention which suggest themselves to those skilled in the art from the description herein. For example, while the method and apparatus have been described within the context of the assembly of an automotive fuel injector, it will be readily appreciated that such a method and apparatus are equally well suited for preloading springs in any valve-type fluid handling device. Furthermore, while various components of apparatus 100 have been described, it will be appreciated that equivalent components may be employed with equal utility.

Having thus described the invention what is claimed is:

1. In a method for assembling a fluid handling apparatus including a valve comprising a movable valve element and a seat mating therewith, said valve element being openable from engagement with said seat against the closing force of a spring at a select critical valve opening fluid pressure applied to said valve element for the passage of said fluid through said valve, a method for determining the preloading of said spring required to maintain said valve in a closed condition at fluid pressures less than said critical opening pressure, said method being characterized by the steps of:

assembling said spring with said valve element such that said spring maintains said valve element closed against opening forces applied thereto by a fluid;

establishing said opening pressure in said fluid;

biasing said spring in a valve closing direction with a force of a magnitude in excess of that corresponding to said opening pressure;

gradually relieving said bias from said spring until said opening pressure causes said valve to open;

measuring the change in dimension of said spring resulting from said bias relief thereon prior to said valve opening; and computing the change in dimension of said spring required to effect a closing of said valve at fluid pressures less than said critical opening pressure from the dimensions of said spring in unbiased and fully biased conditions and the change in dimension of said spring resulting from said relief of said bias prior to said valve opening.

2. The method of claim 1 characterized by the steps of preloading said spring to said computed dimension and assembling said preloaded spring into said fluid handling apparatus.

3. The method of claim 1 characterized by said fluid handling apparatus including a housing, said spring being preloaded by the compression thereof within said housing by shimming.

4. The method of claim 3 characterized by said shimming being effected with a spacer having a thickness equal to the difference in length between said spring in unbiased condition and under said condition of valve opening.

5. In the automated assembly of a fluid handling apparatus including a valve comprising a movable valve element and a seat mating therewith, said valve element being openable from engagement with said seat against the closing force of a spring at a select valve critical opening fluid pressure applied to said valve element for the passage of said fluid through said valve, apparatus for establishing the length of said spring required to maintain said valve in a closed condition at fluid pressures less than said opening pressure, said apparatus being characterized by:

means for operatively connecting said spring with said valve element such that said spring maintains said valve element closed against opening forces applied thereto by a fluid;

means for biasing said spring in a valve closing direction with a force of a magnitude in excess of that corresponding to said opening pressure and gradually relieving said bias from said spring as said spring pressure is maintained on said valve element;

means for detecting an opening of said valve by said fluid when said bias has been sufficiently relieved; and means for determining the change in dimension of said spring as said bias is relieved therefrom prior to said opening of said valve, whereby the change in dimension of said spring required to effect a closing of said valve in said fluid handling apparatus at operating pressures less than said critical opening pressure is readily computable from the dimension of said spring in unbiased and fully biased conditions and said change in spring dimension due to said relief of said bias prior to said valve opening.

6. The apparatus of claim 5 characterized by said means for connecting said spring with said valve element comprising a low friction, force transmitting plunger disposed therebetween and further characterized by said means for biasing said spring comprising a reciprocal press having an output member disposed at an opposite end of said spring from said plunger.

7. The apparatus of claim 5 characterized by a conduit providing communication between said fluid and said valve, said means for detecting an opening of said valve comprising a pressure transducer communicating with said conduit, said pressure transducer sensing a drop in pressure within said conduit, when said valve opens and said fluid passes therethrough.

8. The apparatus of claim 5 characterized by said means for determining the change in dimension of said spring as said bias is relieved therefrom comprising a linear variable differential transformer.

9. The apparatus of claim 8 characterized by said linear variable differential transformer including an input member operatively connected to said biasing means and movable therewith.

* * * * *